3,263,166
PRECISION MOVEMENT MEASURING APPARATUS USING STANDING WAVES
Carroll F. Augustine, Farmington, and Carl P. Tresselt, Detroit, Mich., assignors to The Bendix Corporation, Southfield, Mich., a corporation of Delaware
Filed Aug. 13, 1962, Ser. No. 216,592
3 Claims. (Cl. 324—58.5)

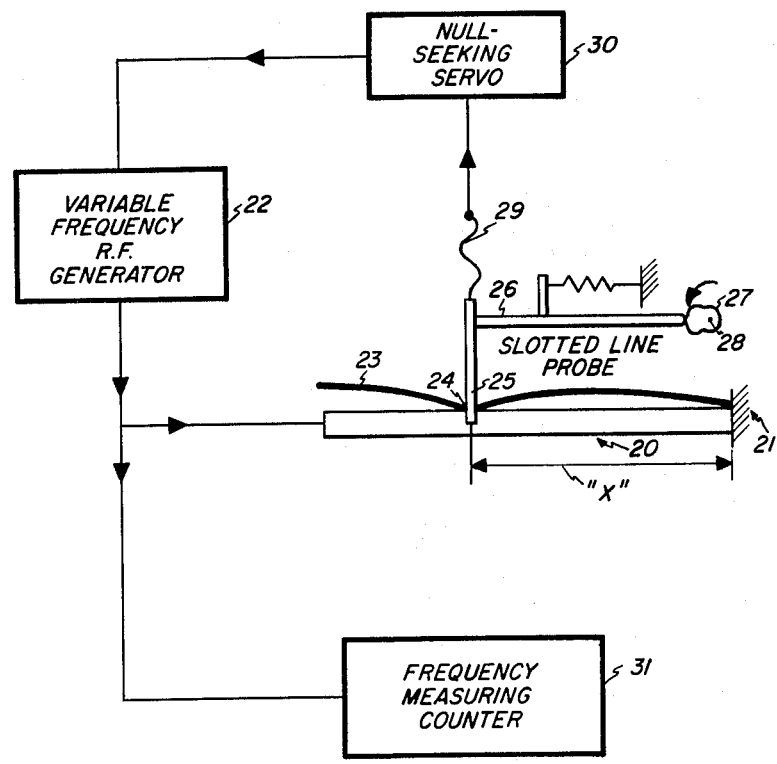

This invention pertains to a measuring gauge and more particularly to a gauge which has a probe in physical contact with the object to be measured. The probe is slideable along a slotted line wave guide in which a standing wave is produced. The standing wave is changed by changing the frequency in the slotted line in proportion to the change in position of the probe in the slotted line. The frequency change is then calibrated to a distance change to very accurately measure the distance change.

Displacement gauges are known to the prior art wherein standing waves in a wave guide are changed by changing either the length of the wave guide or the capacitance in proportion to the displacement and then a change in the amplitude of a standing wave at a measuring point is determined and displacement calibrated. These devices have not been capable of measuring with great accuracy because it is difficult to change the standing wave in precise proportion to the change in wave guide length or change in wave guide capacity, and a change in the standing wave itself is difficult to measure.

In this invention, a probe is movable by the displacement to be measured and is movable in a slotted line wave guide in which a standing wave is provided. A servo system is provided to vary the frequency of the signal in the slotted line wave guide so that a node of the standing wave is always located at the probe. Therefore, if the probe is moved X number of inches by the displacement to be measured, the frequency is changed so that the node of the standing wave is also moved X number of inches. The change in frequency is very directly and very accurately related to the change of position of the node and the node is relatively easy to detect and for these reasons, accuracies exceeding those possible in the past are available.

It is therefore an object of this invention to provide a measuring gauge utilizing standing waves in a wave guide that has extreme accuracy.

It is an object of this invention to provide a measuring gauge having a slotted line wave guide which has a short at one end and has a variable frequency generator at the other end thereby producing a standing wave in the guide; a probe which is movable with object displacement is associated with the wave guide and movable along the wave guide; the probe is capable of signaling the standing wave node and is connected to a servo system which varies the frequency in the variable frequency generator so that the node of the standing wave is always exactly at the probe; the frequency change is very accurately related to the change in position of the probe and the frequency change is measured and calibrated to give the distance change.

These and other objects will become more apparent when a preferred embodiment is considered in connection with the drawing.

In the drawing is shown a T.E.M. (Transverse Electromagnetic) slotted line 20 which has a short 21 at the right end thereof and is fed with a signal from variable frequency R.-F. generator 22 at the left end thereof. Due to the short 21 at the right end of the line 20, the signals entering the left end of line 20 will be reflected and a standing wave will be formed in the line. The profile of the standing wave is shown schematically by the curve 23 which has a node 24.

A probe 25 is movable along the slot in line 20 and is fixed to contact arm 26 which has its free end spring urged against the object to be measured which in this case is a cam 27 pivoted at 28. Probe 25 is capable of measuring the amplitude of standing wave 23 and sends this information through a flexible coupling 29 to a null seeking servo 30 which also is connected to and feeds instructions to varible frequency R.-F. generator 22. As probe 25 is moved by arm 26 due to the change in configuration of cam 27, a signal is sent to servo 30 indicating that the probe is no longer at the node 24. Servo 30 then sends a signal to generator 22 which varies the frequency of the signal fed to line 20 until a standing wave 23 is produced in the line 20 which has a node at the new position of the probe 25.

A frequency measuring counter 31 is connected to generator 22 and measures the frequency change as cam 27 revolves and is calibrated to give reading in inches, or other desired units, corresponding to the frequency change.

The position of the nulls of standing wave 23 is precisely related to the frequency in the line 20, since the nulls represent one half wave length, and wave length is wave velocity over frequency. The distance X between the probe and the short 21 is equal to $$X = \frac{n\lambda}{2}$$

where $n$ equals the number of nodes, and $\lambda$ equals the wave length. This is turn is equal to $nV/2f$ where V equals the wave velocity and $f$ equals the wave frequency.

The wave velocity in the T.E.M. line can be very accurately determined by the relationship $$V = \frac{C}{\sqrt{\epsilon}}$$

where C is the velocity of light and epsilon is the relative dielectric constant of the dielectric in line 20.

It can be readily shown that for a small change in the $$\Delta X \approx \frac{X_1 \Delta f}{f_1}$$

position of the probe 25, the following relationship holds: where $\Delta X$ equals the position change of the probe, $X_1$ equals the distance from the probe 25 to the short 21 before the change, $\Delta f$ equals the change in frequency, and $f_1$ equals the frequency in line 20 before the change.

The calibration of counter 31 becomes unnecessary and the numerical value of the $\Delta f$ will correspond to that of the distance $\Delta X$ in microinches when the following relation holds:

$$\frac{nV}{2f_1^2} = \text{to some integral power of ten.}$$

For example, assuming that we are operating at the first node and $n$ equals 1, then an operating frequency of about 70 megacycles will cause the above relation to be $10^{-6}$ inches seconds/cycle squared and a change in frequency of one cycle per second corresponds to a change in the movement of probe 25 of one microinch. With this relationship, the probe will be in the neighborhood of 78 inches from the short 21.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:
1. A measuring gauge for measuring object displacement between a reference position and a position to be measured comprising generating means for generating a variable high frequency electromagnetic signal, conductor means for receiving said high frequency electromagnetic signal at one end thereof, means for terminating the other end of said conductor means to produce an electromagnetic standing wave therein, probe means, means for providing movement of said probe means along said conductor means in response to the object displacement between a reference position and a position to be measured, said probe means being sensitive to the amplitude of said electromagnetic standing wave, null indicating means being connected to said probe means to indicate a null of the standing wave when the frequency of the variable frequency generating means has been properly adjusted, means for indicating the change in frequency of the standing wave which occurs during the adjustment of the variable frequency generating means thereby indicating the position of the probe means along said conductor means.

2. The gauge of claim 1 with said conductor means being a slotted line T.E.M. mode propogation member having an inner conductor and outer conductor for receiving said high frequency signal at one end and having reflector means at the other end to produce the standing wave therein, said probe means comprising means for measuring the amplitude of an electrical signal, and being movable along said slotted line and electromagnetically coupled to the inner conductor thereof in order to measure the amplitude of the standing wave in said slotted line.

3. The gauge of claim 1 with means being connected between said probe means and said variable frequency generating means for changing the frequency of said generating means until the amplitude measured by said probe means is at a minimum whereby the frequency of said standing wave is adjusted until a minimum point is measured by said probe means.

References Cited by the Examiner

UNITED STATES PATENTS

| | | | |
|---|---|---|---|
| 2,459,197 | 1/1949 | Stewart | 324—58 |
| 2,758,663 | 8/1956 | Snavely. | |
| 2,862,200 | 11/1958 | Shepherd et al. | 324—58.5 X |
| 3,122,665 | 2/1964 | Bailey | 324—58 XR |

OTHER REFERENCES

"A Method of Using Microwaves for Measuring Small Displacements and a Torque-Meter Using This Principle" article in Proceedings of the Institute of Electrical Engineers, October 1954, pp. 522–528.

WALTER L. CARLSON, *Primary Examiner.*

A. E. RICHMOND, *Examiner.*